US010365521B2

(12) United States Patent
Gan

(10) Patent No.: US 10,365,521 B2
(45) Date of Patent: Jul. 30, 2019

(54) ARRAY SUBSTRATE AND LIQUID CRYSTAL DISPLAY PANEL

(71) Applicant: Shenzhen China Star Optoelectronics Technology Co., Ltd., Shenzhen, Guangdong (CN)

(72) Inventor: Qiming Gan, Guangdong (CN)

(73) Assignee: Shenzhen China Star Optoelectronics Technology Co., Ltd, Shenzhen, Guangdong (CN)

( * ) Notice: Subject to any disclaimer, the term of this patent is extended or adjusted under 35 U.S.C. 154(b) by 100 days.

(21) Appl. No.: 15/127,012

(22) PCT Filed: Jul. 11, 2016

(86) PCT No.: PCT/CN2016/089607
§ 371 (c)(1),
(2) Date: Sep. 17, 2016

(87) PCT Pub. No.: WO2017/215058
PCT Pub. Date: Dec. 21, 2017

(65) Prior Publication Data
US 2018/0031935 A1 Feb. 1, 2018

(30) Foreign Application Priority Data
Jun. 16, 2016 (CN) .................. 2016 1 04365418

(51) Int. Cl.
*G02F 1/1345* (2006.01)
*G02F 1/1362* (2006.01)
*G02F 1/13* (2006.01)

(52) U.S. Cl.
CPC ...... *G02F 1/13454* (2013.01); *G02F 1/13452* (2013.01); *G02F 1/136286* (2013.01); *G02F 1/1309* (2013.01); *G02F 2001/13629* (2013.01); *G02F 2201/123* (2013.01)

(58) Field of Classification Search
CPC ............. G02F 1/13452; G02F 1/13454; G02F 1/136286; G02F 2001/13629
See application file for complete search history.

(56) References Cited

U.S. PATENT DOCUMENTS 7,336,093 B2   2/2008  Uei et al.
8,031,155 B2 * 10/2011  Jeoung .................. G09G 3/006
                                                                345/100

(Continued)

FOREIGN PATENT DOCUMENTS

CN      1828396 A    9/2006
CN    101446724 A    6/2009
CN    105261317 A    1/2016

*Primary Examiner* — Dung T Nguyen
(74) *Attorney, Agent, or Firm* — Andrew C. Cheng

(57) ABSTRACT

The present invention provides an array substrate and a LCD panel. The array substrate, which comprises: a display area and a peripheral area, wherein the display area has at least two types of pixel electrodes, gate lines and data lines, which are arranged in rows and columns, one of the gate line is connected to two columns of the corresponding pixel electrodes and two of the data lines are connected to one row of the corresponding pixel electrodes. By the above description, the present invention can resolve requirements of testing HG2D (half-gate two-data line) drive circuit.

6 Claims, 3 Drawing Sheets

(56) References Cited

U.S. PATENT DOCUMENTS

| | | | |
|---|---|---|---|
| 8,253,670 B2* | 8/2012 | Ono | G09G 3/3648 345/87 |
| 8,416,170 B2* | 4/2013 | Zhang | G09G 3/3614 345/92 |
| 2006/0033852 A1 | 2/2006 | Kim et al. | |
| 2013/0321730 A1 | 12/2013 | Hu et al. | |

* cited by examiner

ARRAY SUBSTRATE AND LIQUID CRYSTAL DISPLAY PANEL

FIELD OF THE INVENTION

The present invention relates to a technology of liquid crystal display, and more particularly, to an array substrate and a liquid crystal display panel.

DESCRIPTION OF PRIOR ART

Liquid crystal display (LCD) panel is an existing mainstream display device. In order to ensure quality of the product and increasing the product yield, inside display units of the LCD panel product have to be gave a cell test after cell process. By short-circuiting a shorting bar to gate lines or data lines for cell test, so as to detect various dysfunctions occurred inside the cells.

Refer to FIG. 1, FIG. 1 is an illustrational view of a driving circuit of a LCD panel.

As shown in FIG. 1, the driving circuit 100 is formed by some gate lines 110, some data lines 120 and some pixel units 130. Wherein each pixel unit 130 is formed by a gate line 110 and a data line 120, and the gate line 110 and the data line 120 surround the pixel unit 130. The shorting bar is located in the periphery of the pixel unit 130, and short-circuits the gate line 110 and the data line 120 to be gave a cell test after cell process.

SUMMARY OF THE INVENTION

The present invention provides an array substrate and a LCD panel which can meet the requirements of testing HG2D (half-gate two-data line) drive circuit.

The present invention utilizes the following technical measurements to address the issues encountered by prior arts. The present invention providing an array substrate, which comprises:

A display area and a peripheral area;

wherein the display area has at least two types of pixel electrodes, gate lines and data lines, which are arranged in rows and columns, one of the gate line is connected to two columns of the corresponding pixel electrodes and two of the data lines is connected to one row of the corresponding pixel electrodes;

wherein the peripheral area has a first shorting bar and a second shorting bar arranged thereof for testing, the first shorting bar is connected to the gate lines and the second shorting bar is connected to the data lines, the pixel electrodes of same type are interconnected to each other by the second shorting bar;

wherein the first shorting bar comprises a first and second conductive pads, the gate lines in all odd columns is connected to the first conductive pad and the gate lines in all even columns is connected to the second conductive pad;

wherein the second shorting bar comprises three conductive pads, and the pixel electrodes includes red, green and blue pixel electrodes, each of the pixel electrode is connected to a conductive pad via the corresponding data lines.

According to a preferred embodiment of the invention, wherein including a third shorting bar, and which is used to connect to common electrodes.

The present invention utilizes another following technical measurements to resolve encountered by prior arts. The present invention providing an array substrate, which comprises:

A display area and a peripheral area;

wherein the display area has at least two types of pixel electrodes, gate lines and data lines, which are arranged in rows and columns, one of the gate line is connected to two columns of the corresponding pixel electrodes and two of the data lines is connected to one row of the corresponding pixel electrodes;

wherein the peripheral area has a first shorting bar and a second shorting bar arranged thereof for testing, the first shorting bar is connected to the gate lines and the second shorting bar is connected to the data lines, the pixel electrodes of same type are interconnected to each other by the second shorting bar;

According to a preferred embodiment of the invention, the first shorting bar comprises a first and second conductive pads, the gate lines in all odd columns is connected to the first conductive pad and the gate lines in all even columns is connected to the second conductive pad.

According to a preferred embodiment of the invention, the second shorting bar comprises three conductive pads, and the pixel electrodes includes red, green and blue pixel electrodes, each of the pixel electrode is connected to a conductive pad via the corresponding data line.

According to a preferred embodiment of the invention, wherein including a third shorting bar, and which is used to connect to common electrodes.

In order to resolve the above problem, the present invention further utilizes another following technical measurements to resolve encountered by prior arts. The present invention provides a LCD panel, which comprises:

a first substrate and a second substrate arranged relatively and the first substrate comprising a display area and a peripheral area;

wherein the display area has at least two types of pixel electrodes, gate lines and data lines, which are arranged in rows and columns, one of the gate line is connected to two columns of the corresponding pixel electrodes and two of the data lines is connected to one row of the corresponding pixel electrodes;

wherein the peripheral area has a first shorting bar and a second shorting bar arranged thereof for testing, the first shorting bar is connected to the gate lines and the second shorting bar is connected to the data lines, the pixel electrodes of same type are interconnected to each other by the second shorting bar.

wherein the first shorting bar comprises a first and second conductive pads, the gate lines in all odd columns is connected to the first conductive pad and the gate lines in all even columns is connected to the second conductive pad;

wherein the second shorting bar comprises three conductive pads, and the pixel electrodes includes red, green and blue pixel electrodes, each of the pixel electrode is connected to a conductive pad via the corresponding data line; and wherein including a third shorting bar, and which is used to connect to common electrodes.

The present invention can be concluded with the following advantages, by providing a detecting circuit accordance with the present invention, not only the testing of the circuit of the HG2D driving circuitry can be properly satisfied, but also ensure a high quality testing result.

DESCRIPTION OF PREFERRED EMBODIMENT

Technical implementation will be described below clearly and fully by combining with drawings made in accordance with an embodiment in the present invention. Obviously, the described embodiments are merely part of embodiment of the present invention, not at all. Based on the embodiments of the present invention, on the premise of embodiments in the absence of creative work, all other embodiments are in the scope of protection in the present invention.

Figure 1:
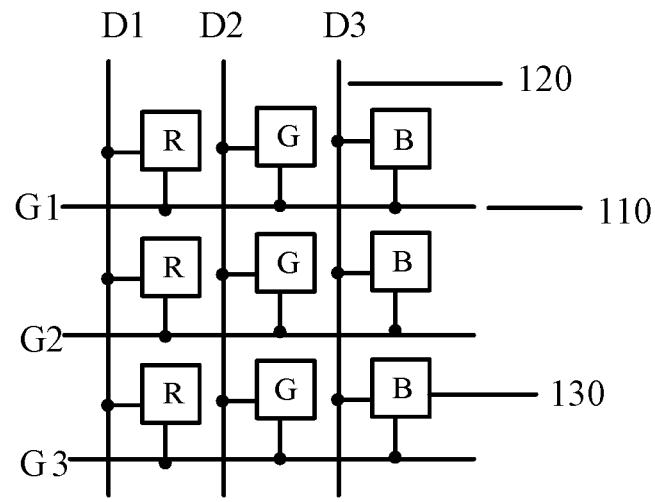
FIG. 1 is an illustrational view of a driving circuit of a LCD panel.
Figure 2:
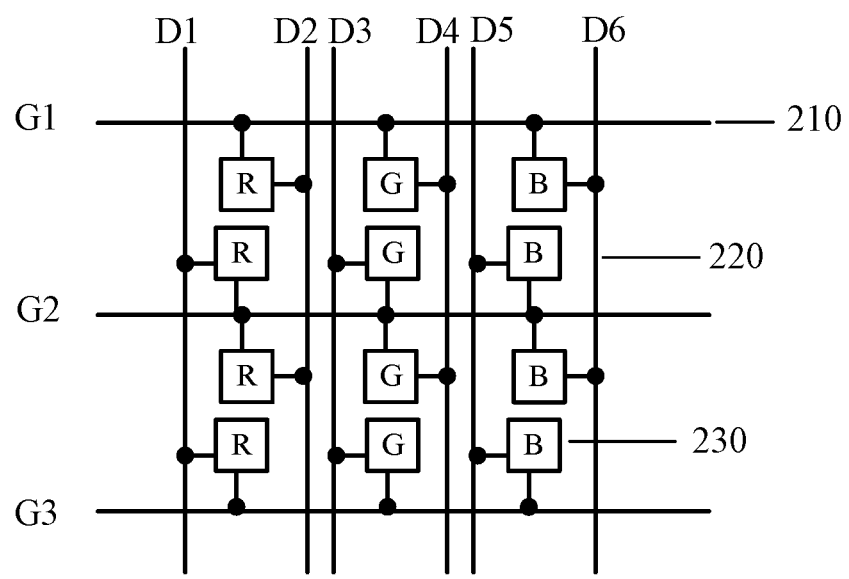
FIG. 2 is an illustrational view of a HG2D driving circuit of a LCD panel in accordance with the embodiment of the present invention.

Referring to FIG. 2, FIG. 2 is an illustrational view of a HG2D driving circuit of a LCD panel in accordance with the embodiment of the present invention.

As shown in FIG. 2, the HG2D driving circuit 200 is formed by some gate lines 210, some data lines 220 and some pixel electrodes 230. Wherein one of the gate line 210 is connected to two columns of the corresponding pixel electrodes 230 and two of the data lines 220 are connected to one row of the corresponding pixel electrodes 230.

Figure 3:
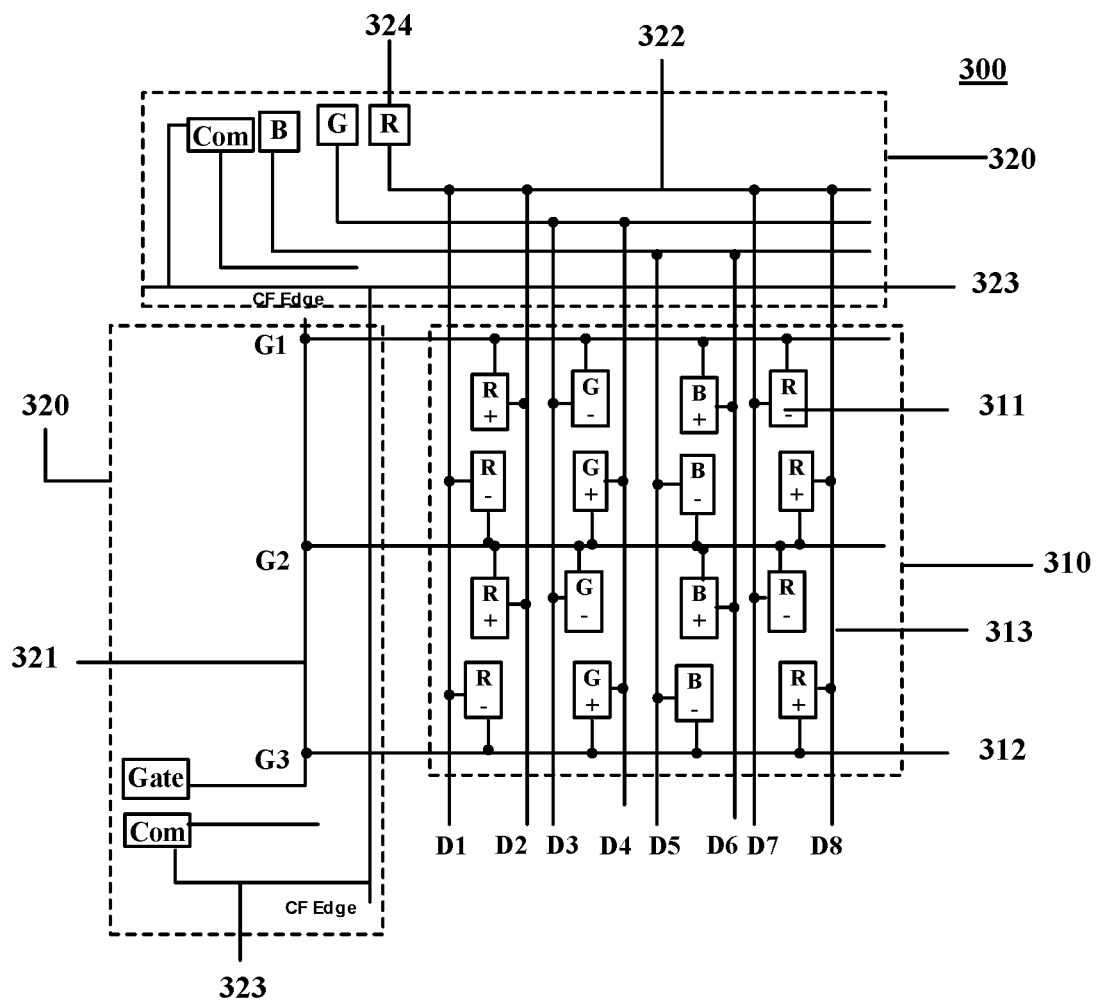
FIG. 3 is an illustrational view of an array substrate in accordance with the embodiment of the present invention, in which shorting bars are shown.

Referring to FIG. 3, FIG. 3 is an illustrational view of an array substrate in accordance with the embodiment of the present invention.

As shown in FIG. 3, the array substrate 300 comprises a display area 310 and a peripheral area 320. Wherein the display area has at least two types of pixel electrodes 311, gate lines 312 and data lines 313, which are arranged in rows and columns.

Wherein the gate line 312 is used for supplying scan signals and the data line 313 is used for supplying pixel signals. One of the gate line 312 is connected to two columns of the corresponding pixel electrodes 311 and two of the data lines 313 are connected to one row of the corresponding pixel electrodes 311. Further, the pixel electrodes 311 can include red, green and blue pixel electrodes.

Wherein, the peripheral area 320 has a first shorting bar 321 and a second shorting bar 322 arranged thereof for testing. The first shorting bar 321 is connected to the gate lines 312 and the second shorting 322 bar is connected to the data lines 313, and the pixel electrodes 311 of same types are interconnected with each other by the second shorting bar 312. Wherein The first shorting bar 321 and the second shorting bar 322 are used to short-circuit the individual data line 313 or the gate line 312. By the application of the first shorting bar 321 and the second bar 322, signals can be sent to the pixel electrode 311 so to perform cell test. Wherein the first shorting bar 321 comprises one conductive pad 324, and the second shorting bar 322 comprises three conductive pads 324. Red, green and blue pixel electrodes of each of the pixel electrodes 311 is connected to one of the conductive pad 324 via the corresponding data lines 313.

The embodiment in above description, not only the testing of the circuit of the HG2D driving circuitry can be properly satisfied, but also ensure a high quality testing result.

Referring to FIG. 3, the embodiment of the array substrate of the invention further includes a third shorting bar 323, and which is used to connect to common electrodes.

In the embodiment, G1, G2, G3 are opened high potential by supplying scan signals to the gate line 312 via the first shorting bar 321, and D1 and D2 in the data line 313 are supplied red (R) pixel signals (it can be either one of red, green and blue pixel signals) via the second shorting bar 322 simultaneously. Wherein if in the display area 310, the D1, D2 array pixel electrode 311, which are corresponding to the satisfied R pixel, are lit, while the rest electrodes are not lit up, then it indicates that the R array pixel electrode 311 are normal. Conversely, if in the display area 310, the D1, D2 array pixel electrode 311, which are corresponding to the satisfied R pixel, are not lit, then it indicates that there is a short circuit or an open circuit between the R pixel electrodes 311.

In the embodiment, G1, G2, G3 are opened high potential by supplying scan signals to the gate line 312 via the first shorting bar 321, and D1, D2, D5 and D6 in the data line 313 are supplied two different pixel signals (i.e., red (R) pixel signals and blue (B) pixel signals.) via the second shorting bar 322 simultaneously. Wherein if in the display area 310, the D1, D2, D5 and D6 column pixel electrode 311, which are corresponding to the satisfied R and B pixel, are lit, then it indicates that the R and B array pixel electrode 311 are normal. Conversely, if in the display area 310, the D1, D2, D5 and D6 column pixel electrode 311, which are corresponding to the satisfied B pixel, are not lit, or lit on other array pixel electrode, then it indicates that there is a short circuit or an open circuit between the R pixel electrodes 311 in the display area 310.

Wherein G1, G2, G3 are opened high potential by supplying scan signals to the gate line 312 via the first shorting bar 321, and D1, D2, D3 and D4 in the data line 313 are supplied the same pixel signals via the second shorting bar 322 simultaneously. so it can achieve solid color screen test.

Further, method for testing other the pixel electrode 311 is the same to the description above, therefore no additional description is given herebelow.

Figure 4:
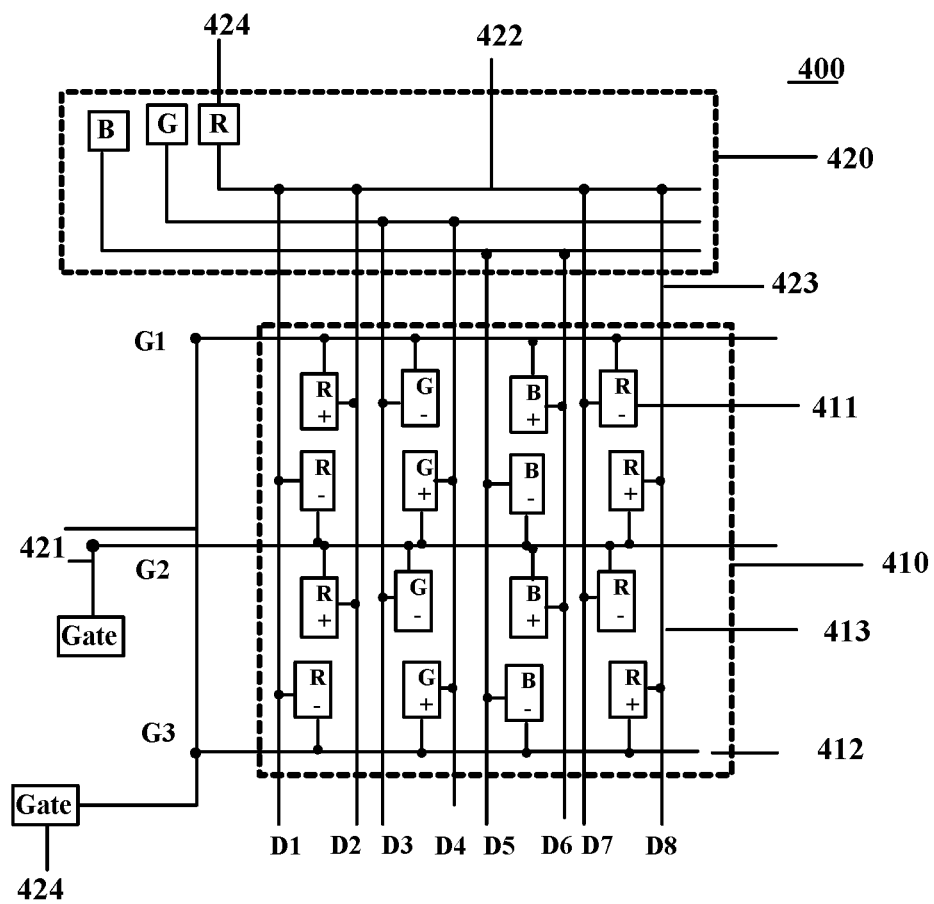
FIG. 4 is an illustrational view of an array substrate in accordance with the other embodiment of the present invention.

Referring to FIG. 4, FIG. 4 is an illustrational view of an array substrate in accordance with the other embodiment of the present invention.

As shown in FIG. 4, the array substrate 400 comprises a display area 410 and a peripheral area 420. Wherein the display area has at least two types of pixel electrodes 411, gate lines 412 and data lines 413, which are arranged in rows and columns.

Wherein the gate line 412 is used for supplying scan signals and the data line 413 is used for supplying pixel signals. One of the gate line 412 is connected to two columns of the corresponding pixel electrodes 411 and two of the data lines 413 are connected to one row of the corresponding pixel electrodes 411. Further, the pixel electrodes 411 can include red, green and blue pixel electrodes.

Wherein, the peripheral area 420 has a first shorting bar 421 and a second shorting bar 422 arranged thereof for testing. The first shorting bar 421 is connected to the gate lines 412 and the second shorting 422 bar is connected to the data lines 413, and the pixel electrodes 411 of same type are interconnected with each other by the second shorting bar 412. Wherein The first shorting bar 421 and the second shorting bar 422 are used to short-circuit the individual data line 413 or the gate line 412. By the application of the first shorting bar 321 and the second bar 422, signals can be sent to the pixel electrode 411 so to perform cell test. Wherein the first shorting bar 421 comprises a first and second conductive pads 424, the gate lines 412 in all odd columns is connected to the first conductive pad 424 and the gate lines 412 in all even columns is connected to the second conductive pad 424. The second shorting bar 422 comprises three conductive pads 424. Red, green and blue pixel electrodes of each of the pixel electrodes 411 is connected to one of the conductive pad 424 via the corresponding data lines 413.

In the embodiment, G2 is opened high potential by supplying scan signals to G2 of the gate lines 412 in all even columns via the first shorting bar 421, and D1 and D2 in the data line 413 are supplied red (R) pixel signals (it can be either one of red, green and blue pixel signals) via the second shorting bar 422 simultaneously. Wherein if in the display area 410, the G2 of two columns pixel electrode 411, which are corresponding to the satisfied R pixel, are lit, then it indicates that the part of R pixel electrode 411 are normal. Conversely, if in the display area 410, the G2 of two columns pixel electrode 411, which are corresponding to the satisfied R pixel, are not lit, then it indicates that there is a short circuit or an open circuit between the part of R pixel electrodes 411 in the display area 410.

In the embodiment, G1 and G3 is opened high potential by supplying scan signals to G1 and G3 of the gate lines 412 in all odd columns via the first shorting bar 421, and D1 and D2 in the data line 413 are supplied red (R) pixel signals (it can be either one of red, green and blue pixel signals) via the second shorting bar 422 simultaneously. Wherein if in the display area 410, the G1 and G3 of two columns pixel electrode 411, which are corresponding to the satisfied R pixel, are lit, then it indicates that the part of R pixel electrode 411 are normal. Conversely, if in the display area 410, the G1 and G3 of two columns pixel electrode 411, which are corresponding to the satisfied R pixel, are not lit, or G2 pixel electrode 411, which are corresponding to the satisfied R pixel, are lit, then it indicates that there is a short circuit or an open circuit between the part of R pixel electrodes 411 in the display area 410.

Wherein, in the embodiment, when scan signals are supplied to the gate lines 412 in odd or even columns by the first shorting bar 421, it can be supplied two different or the same pixel signals to D1, D2, D5 and D6 in the data line 413 via the second shorting bar 422 for cell testing. The method for testing is the same to the description above, therefore no additional description is given herebelow.

Figure 5:
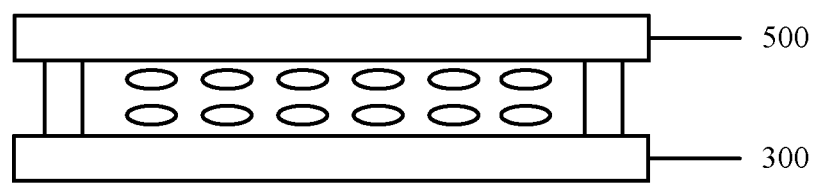
FIG. 5 is an illustrational view of a display device with the array substrate in accordance with the embodiment of the present invention.

Referring to FIG. 5, FIG. 5 is an illustrational view of a display device with the array substrate in accordance with the embodiment of the present invention.

As shown in FIG. 5, the present invention provides a display device 10 with the array substrate, which comprises: a first substrate 300 and a second substrate 500 arranged relatively. Wherein structure of the first substrate structure 300 is referred above description, therefore no additional description is given herebelow.

In summary, skilled in the arts appreciate that the present invention provides a detecting circuit which can be satisfied the HG2D driving circuit in above description.

Embodiments of the present invention have been described, but not intending to impose any unduly constraint to the appended claims. Any modification of equivalent structure or equivalent process made according to the disclosure and drawings of the present invention, or any application thereof, directly or indirectly, to other related fields of technique, is considered encompassed in the scope of protection defined by the claims of the present invention.

The invention claimed is:

1. An array substrate, which comprising a display area and a peripheral area;

wherein the display area has at least two kind of pixel electrodes, gate lines and data lines, which are arranged in rows and columns, each of the gate lines being connected to two columns of the pixel electrodes and every two of the data lines being connected to one row of the pixel electrodes;

the peripheral area having a first shorting bar and a second shorting bar arranged therein for testing, the first shorting bar being connected to the gate lines and the second shorting bar being connected to the data lines, the pixel electrodes of same kind being interconnected with each other by the second shorting bar;

the first shorting bar comprising one conductive pad that is connected to each of the gate lines; and the second shorting bar comprising a first conductive pad, a second conductive pad, and a third conductive pad;

wherein the pixel electrodes are divided into a plurality of first pixel units and a plurality of second pixel units, the plurality of second pixel units are arranged alternately with the plurality of first pixel units in rows and in columns;

the first pixel unit comprises a first red pixel electrode, a first green pixel electrode, and a first blue pixel electrode arranged successively; the first red pixel electrode is positive, the first green pixel electrode is negative, and the first blue pixel electrode is positive;

the second pixel unit comprises a second red pixel electrode, a second green pixel electrode, and a second blue pixel electrode arranged successively; the second red pixel electrode is negative, the second green pixel electrode is positive, and the second blue pixel electrode is negative;

the first and the second pixel electrodes in the display area are all connected to the first conductive pad through corresponding data lines, the first and the second green pixel electrodes in the display area are all connected to the second conductive pad, and the first and the second blue pixel electrodes in the display area are all connected to the third conductive pad.

2. The array substrate as recited in claim 1, further including a third shorting bar, which is connected to common electrodes.

3. The array substrate as recited in claim 1, wherein the multiple conductive pads of the second shorting bar comprise three conductive pads, and wherein the pixel electrodes comprise red, green and blue pixel electrodes, which are respectively connected to the three conductive pads through the corresponding data lines.

4. The array substrate as recited in claim 3, wherein include a third shorting bar, which is connected to common electrodes.

5. A liquid crystal display panel, comprising:

a first substrate and a second substrate arranged opposite to each other, the first substrate comprising a display area and a peripheral area;

wherein the display area has at least two kind of pixel electrodes, gate lines and data lines, which are arranged in rows and columns, each of the gate lines being connected to two columns of the pixel electrodes and every two of the data lines being connected to one row of the pixel electrodes; and the peripheral area having a first shorting bar and a second shorting bar arranged therein for testing, the first shorting bar being connected to the gate lines and the second shorting bar being connected to the data lines, the pixel electrodes of same kind being interconnected with each other by the second shorting bar;

the first shorting bar comprising one conductive pad that is connected to each of the gate lines;

the second shorting bar comprising a first conductive pad, a second conductive pad, and a third conductive pad;

wherein the pixel electrodes are divided into a plurality of first pixel units and a plurality of second pixel units, the plurality of second pixel units are arranged alternately with the plurality of first pixel units in rows and in columns;

the first pixel unit comprises a first red pixel electrode, a first green pixel electrode, and a first blue pixel electrode arranged successively; the first red pixel electrode is positive, the first green pixel electrode is negative, and the first blue pixel electrode is positive;

the second pixel unit comprises a second red pixel electrode, a second green pixel electrode, and a second blue pixel electrode arranged successively; the second red pixel electrode is negative, the second green pixel electrode is positive, and the second blue pixel electrode is negative;

the first and the second pixel electrodes in the display area are all connected to the first conductive pad through corresponding data lines, the first and the second green pixel electrodes in the display area are all connected to the second conductive pad, and the first and the second blue pixel electrodes in the display area are all connected to the third conductive pad.

6. The liquid crystal display panel as recited in claim 5, further comprising a third shorting bar, which is connected to common electrodes.

* * * * *